United States Patent
Oh

(10) Patent No.: US 9,078,543 B2
(45) Date of Patent: Jul. 14, 2015

(54) DISPOSABLE GRINDER

(76) Inventor: Kil Young Oh, Yongin-si (KR)

( * ) Notice: Subject to any disclaimer, the term of this patent is extended or adjusted under 35 U.S.C. 154(b) by 137 days.

(21) Appl. No.: 13/696,773

(22) PCT Filed: May 11, 2011

(86) PCT No.: PCT/KR2011/003456
§ 371 (c)(1), (2), (4) Date: Nov. 7, 2012

(87) PCT Pub. No.: WO2011/142577
PCT Pub. Date: Nov. 17, 2011

(65) Prior Publication Data
US 2013/0048771 A1    Feb. 28, 2013

(30) Foreign Application Priority Data

May 11, 2010    (KR) .................... 20-2010-0004943 U

(51) Int. Cl.
*A47J 43/046* (2006.01)
*A47J 43/08* (2006.01)
*A47J 43/07* (2006.01)

(52) U.S. Cl.
CPC ............ *A47J 43/046* (2013.01); *A47J 43/0727* (2013.01); *A47J 43/085* (2013.01)

(58) Field of Classification Search
CPC ........ A47J 31/44; A47J 43/046; A47J 43/085

USPC ...................... 241/101.2, 282.1, 282.2, 285.2
See application file for complete search history.

(56) References Cited

U.S. PATENT DOCUMENTS 4,946,287 A    8/1990  Barnard et al.

FOREIGN PATENT DOCUMENTS

| GB | 2392834 A | * | 3/2004 |
| JP | 2008-161682 | | 7/2008 |
| KR | 20-0293834 | | 10/2002 |
| KR | 10-2006-0057597 | | 5/2006 |

* cited by examiner

*Primary Examiner* — Mark Rosenbaum
(74) *Attorney, Agent, or Firm* — John K. Park; Park Law Firm

(57) ABSTRACT

Provided is a disposable grinder mounted on or demounted from a mixer. The disposable grinder includes a cover that opens or closes an opening of a container, a rotation shaft that is rotatably installed on a central portion of the cover, is mounted on the mixer, and is supplied with a rotational force of the mixer, a grinding part that is coupled to the rotation shaft so as to be housed inside the container and has a plurality of grinding blades receiving a rotational force of the rotation shaft to grind contents contained in the container, and a plurality of ribs that protrude radially from the central portion of the cover and from an inner surface of the cover, and collide with the contents ground by the grinding part to re-grind the ground contents.

4 Claims, 4 Drawing Sheets

DISPOSABLE GRINDER

TECHNICAL FIELD

The present invention relates, in general, to a disposable grinder and, more particularly, to a disposable grinder, capable of being coupled to a container in which fruits, vegetables, etc. are contained, grinding the fruits, the vegetables, etc. using a plurality of grinding blades mounted in the container to make juice, and being separated from the container as a disposable when the juice is fully made.

BACKGROUND ART

In general, disposable beverage containers are beverage containers that can be used only once and then thrown away.

These disposable beverage containers are used at shops such as fast food shops, snack bars, take-out shops, and beverage shops at which an amount of use thereof is very frequent. That is, when any consumer orders a beverage such as a coffee beverage, a juice beverage, or a carbonated beverage, the ordered beverage is contained in the disposable beverage container, and is handed over to the consumer. Then, the consumer drinks the beverage, and throws the container away.

As the quality of life increases these days, consumers prefer health foods, particularly juice beverages obtained by directly grinding raw fruits or vegetables to make processed beverages sold at beverage shops.

These juice beverages made of raw fruits or vegetables and provided to consumers are made in such a way that the raw fruits or vegetables that are the raw materials for the juice beverages are ground by a mixer and then the ground materials are contained in the disposable beverage containers.

However, a wide variety of fruits or vegetables are made into juice beverages at shops according to the taste of the consumer. As the amount of juice beverage made increases, the grinding blades of a mixer, which grind the fruits or vegetables, are used without being washed each time, and thus are unsanitary. Further, the merchantability of the juice beverage is reduced.

In addition, to wash the grinding blades of the mixer, the grinding blades are disassembled from the mixer. In this case, there is a fear of a user being injured by the grinding blades.

DISCLOSURE

Technical Problem

Accordingly, the present invention has been made keeping in mind the above problems occurring in the related art, and is intended to provide a disposable grinder, in which a plurality of grinding blades are installed on a cover opening or closing a container, thereby being capable of directly grinding fruits and/or vegetables into a juice, and being thrown away after being used only once, and sanitarily supplying the juice.

Further, the present invention serves to provide a disposable grinder, in which a plurality of ribs protrude from an inner surface of the cover, and collide with and re-grind the fruits and/or the vegetables ground by the grinding blades, thereby being capable of increasing a grinding effect.

In addition, the present invention serves to provide a disposable grinder, in which a cover and grinding blades are firmly fastened, thereby being capable of being safely used when the grinding blades are rotated at a high speed.

Technical Solution

In an aspect, the present invention provides a disposable grinder mounted on or demounted from a mixer. The disposable grinder includes: a cover that opens or closes an opening of a container; a rotation shaft that is rotatably installed on a central portion of the cover, is mounted on the mixer, and is supplied with a rotational force of the mixer; a grinding part that is coupled to the rotation shaft so as to be housed inside the container, and has a plurality of grinding blades receiving a rotational force of the rotation shaft to grind contents contained in the container; and a plurality of ribs that protrude radially from the central portion of the cover and from an inner surface of the cover, and collide with the contents ground by the grinding part to re-grind the ground contents.

Here, the disposable grinder may further include a fastening member that fixes the grinding part and the rotation shaft so as not to be separated from each other.

Further, the fastening member may include a fastening pin that passes through the grinding part and is fastened to the rotation shaft, and a fixing plate that is formed on the fastening pin so as to prevent the grinding part from being separated from the fastening pin and to fix the grinding part.

In addition, the plurality of grinding blades may be disposed around an axis of the rotation shaft at regular intervals, and blade faces thereof may be bent at different angles with respect to the inner surface of the cover.

Advantageous Effects

As described above, the disposable grinder of the present invention is configured so that the plurality of grinding blades are installed on the cover opening or closing the container, and thus directly grinds fruits and/or vegetables into a juice. The disposable grinder can be thrown away after being used only once, and thus the juice can be supplied sanitarily.

Further, the plurality of ribs formed in the inner surface of the cover re-grind the fruits and/or the vegetables ground by the grinding blades, so that a good quality of juice can be supplied.

In addition, the cover and the grinding blades are firmly fastened, and thus the disposable grinder can be safely used when the grinding blades are rotated at a high speed.

DESCRIPTION OF REFERENCE CHARACTERS OF IMPORTANT PARTS

Figure 1:
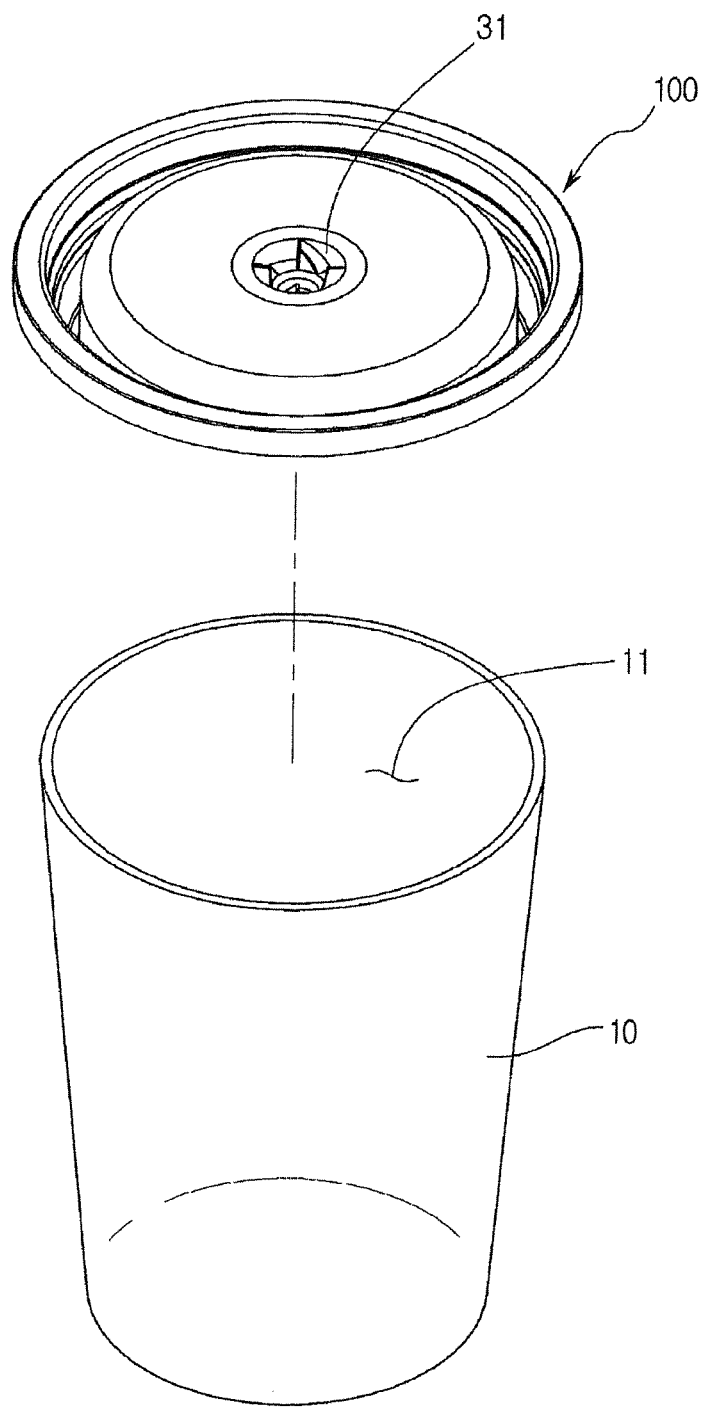
FIG. 1 is a perspective view showing a disposable grinder according to an embodiment of the present invention.

10: container
11: opening
20: cover
21: coupling step
23: through-hole
30: rotation shaft
31: mounting part
33: fastening hole
40: grinding part
41: coupling shaft 42: fitting ridge
43: first grinding blade
45: second grinding blade
47: third ghrinding blade
49: fourth grinding blade
50: rib
60: fastening member
61: fastening pin
63: fastening knob
65: inclined step
200: mixer
210: driving shaft
220: transmission part
230: cover holder
240: cup holder

MODE FOR INVENTION

Reference will now be made in greater detail to an exemplary embodiment of the invention with reference to the accompanying drawings. The present invention is not limited to the embodiment described below as long as it does not depart from its spirit and scope.

Figure 2:
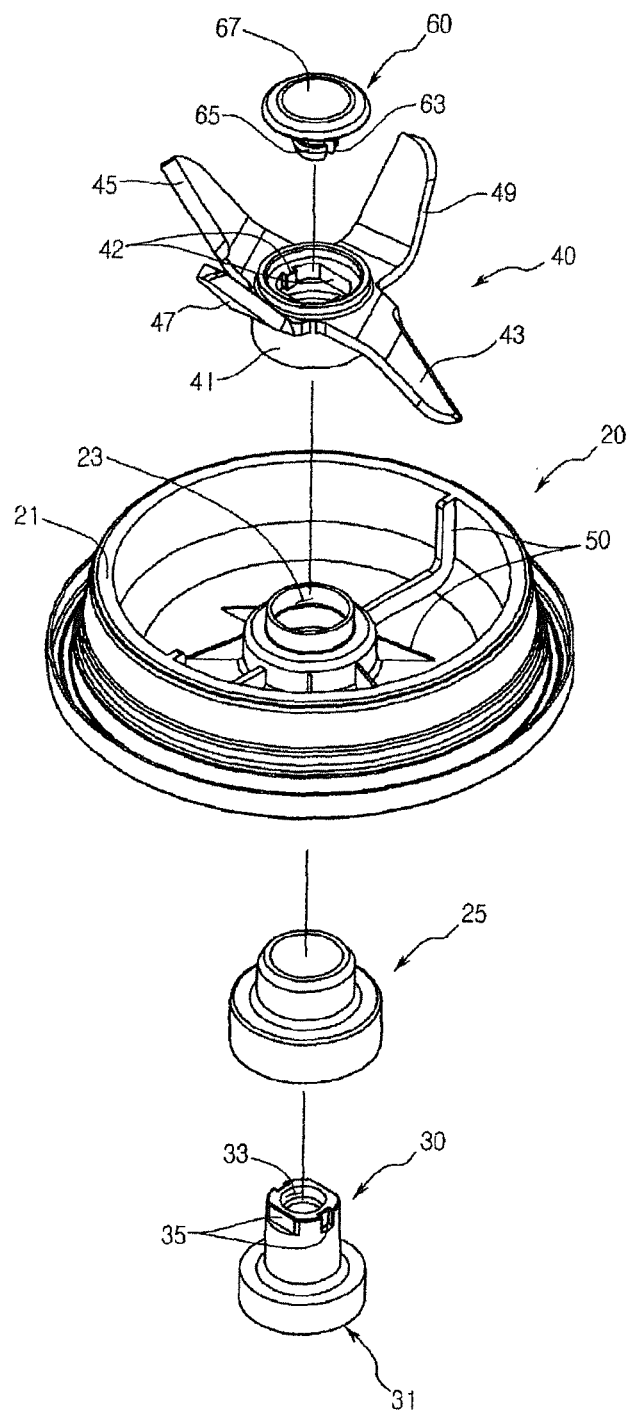
FIG. 2 is an exploded perspective view showing a structure of the disposable grinder according to the embodiment of the present invention.
Figure 3:
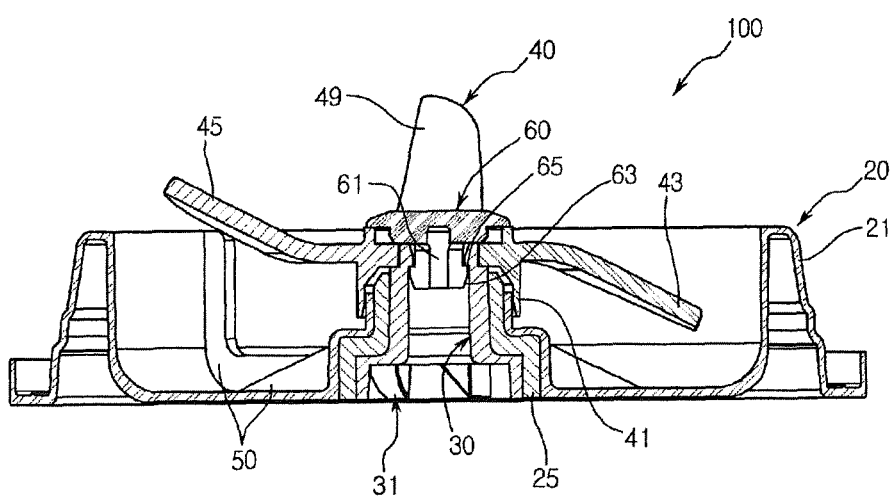
FIG. 3 is a cross-sectional view showing a structure of the disposable grinder according to the embodiment of the present invention.

FIG. 1 is a perspective view showing a disposable grinder according to an embodiment of the present invention. FIG. 2 is an exploded perspective view showing a structure of the disposable grinder according to the embodiment of the present invention. FIG. 3 is a cross-sectional view showing a structure of the disposable grinder according to the embodiment of the present invention.

As shown in FIGS. 1 to 3, the disposable grinder 100 according to the embodiment of the present invention includes: a cover 20 that opens or closes an opening 11 of a container 10; a rotation shaft 30 that is installed on the cover and is rotatably mounted on the mixer; a grinding part 40 that is coupled to the rotation shaft and grinds contents contained in the container 10; and a plurality of ribs 50 that are formed on an inner surface of the cover 20 and re-grind the contents ground by the grinding part 40, and a fastening member 60 that fixes the grinding part 40 and the rotation shaft 30 so as not to be separated from each other.

The container 10 has the opening 11 formed in one end thereof, and allows the contents to enter through this opening 11.

The container 10 may be formed of a transparent material so as to be able to distinguish the contents in the container 10 with the naked eye.

Here, the contents include a variety of fruits and vegetables that are ground by the grinding part 40 to provide juices. In addition to the fruits and vegetables, the contents may include foods that are ground by the grinding part 40 and are then provided as beverages.

The cover 20 is detachably installed on the opening 11 so as to open or close the opening 11 of the container 11. In detail, as shown in FIG. 2, the cover 20 has cylindrical shape corresponding to the shape of the opening 11 of the container 10, and is coupled to the opening 11, thereby sealing the container 10.

To this end, the cover 20 has a coupling step 21 protruding from a circumference thereof. The coupling step 21 is inserted into and brought into close contact with the opening 11 of the container 10. Thereby, the container 10 is sealed to prevent the contents contained in the container 10 from leaking.

Here, the container 10 may be formed in an elliptical shape or a polygonal shape other than the cylindrical shape. Thus, the shape of the cover 20 may be variously deformed corresponding to the opening 11 of the container 10.

The cover 20 is provided with a through-hole 23 in a central portion thereof through which the rotation shaft 30 passes.

The rotation shaft 30 is rotatably installed in the through-hole 23 of the cover 20, and is provided with a mounting part 31 mounted on a mixer at one end thereof. Further, the rotation shaft 30 is provided with a plurality of fitting recesses 35 in the other end thereof so as to allow the grinding part 40 to be coupled.

Here, the mounting part 31 is exposed to an outer surface of the cover 20, is formed in a corrugated shape, and is mounted on a driving shaft (see FIG. 4) of the mixer. Thus, the rotation shaft 30 is supplied with a rotational force by driving of the mixer.

A guide shaft 25 guiding rotation of the rotation shaft 30 is installed in the through-hole 23 of the cover.

The guide shaft 25 is formed in the shape of a pipe whose inside is bored, and is fixed to the through-hole 23 of the cover 20. The rotation shaft 30 is rotatably coupled on an inner side of the guide shaft 25. Thus, the rotation shaft 30 can be smoothly rotated in the through-hole 23 of the cover 20.

The grinding part 40 is coupled to the other end of the rotation shaft 30 so as to be housed inside the container 10.

The grinding part 40 includes a coupling shaft 41 coupled to the rotation shaft 30, and a plurality of grinding blades 43, 45, 47 and 49 formed along a circumferential surface of the coupling shaft 41.

The coupling shaft 41 is bored so that the rotation shaft 30 is coupled, and has a plurality of fitting ridges formed along an inner circumferential surface thereof. The plurality of fitting ridges 42 are formed so as to correspond to the plurality of fitting recesses 35 of the rotation shaft, and thus are mutually coupled to the plurality of fitting recesses 35. As such, when the rotation shaft 30 rotates, the coupling shaft 41 does not run idle around the rotation shaft 30. Thus, the plurality of grinding blades 43, 45, 47 and 49 are allowed to easily grind the contents.

The plurality of grinding blades 43, 45, 47 and 49 are disposed around an axis of the rotation shaft 30 at regular intervals, and blade faces thereof are bent at different angles with respect to the inner surface of the cover 20.

In the present embodiment, as shown in FIG. 2, the four grinding blades are provided to the coupling shaft 41 at regular intervals.

The first grinding blade 43 is bent toward the inner surface of the cover 20 at an acute angle. The second grinding blade 45 provided on the opposite side of the first grinding blade 43 at the coupling shaft 41 is bent toward the bottom surface of the container 10 at an acute angle.

The third grinding blade 47 provided between the first and second grinding blades 43 and 45 is bent toward to the bottom surface of the container 10 at a greater angle than the second grinding blade 45. The fourth grinding blade 49 provided on the opposite side of the third grinding blade 47 at the coupling shaft 41 is bent toward the bottom surface of the container 10 at a greater angle than the third grinding blade 47.

In this way, the first, second, third and fourth grinding blades 43, 45, 47 and 49 are configured to be bent at different angles, and thus are effective in uniformly grinding the contents.

Meanwhile, the plurality of ribs 50 protrude radially from the central portion of the cover 20 and from the inner surface of the cover 20, and cause the contents ground by the grinding part 40 to collide therewith and be ground again.

In detail, when the plurality of grinding blades 43, 45, 47 and 49 of the grinding part 40 grind the contents contained in the container 10, the ground contents are rotated along with the plurality of grinding blades 43, 45, 47 and 49. In this case, the ground contents collide with the plurality of ribs 50 protruding on the inner surface of the cover 20, and thus are more finely ground.

Further, the plurality of ribs 50 function to reinforce rigidity of the inner surface of the cover 20, and prevent the cover 20 from being broken by grinding pressure when the grinding part 40 is rotated at a high speed by the mixer.

The fastening member 60 functions to fix the rotation shaft 30 and the grinding part 40 so as not to be separated from each other.

The fastening member 60 includes a fastening pin 61 that passes through the grinding part 40 and is fastened to the rotation shaft 30, and a fixing plate 67 that is formed on the fastening pin 61 so as to prevent the grinding part 40 from being separated from the fastening pin 61 and to fix the grinding part 40.

In detail, a fastening hole 33 is formed in the central portion of the rotation shaft 30, and a communicating hole 42 spatially connected with the fastening hole 33 is formed in the coupling shaft 41 of the grinding part 40 coupled to the rotation shaft 30. The fastening pin 61 of the fastening member 60 passes through the communicating hole 42 of the coupling shaft 41, and is fastened to the fastening hole 33 of the rotation shaft 30. The fixing plate 67 provided to the fastening pin 61 is brought into close contact with an end of the coupling shaft 41, and supports the coupling shaft 41.

Here, the fastening pin 61 is provided with a fastening knob 63 at an end thereof which has an inclined step 65 whose diameter is greater than that of the fastening hole 33. The fastening knob 63 is forcibly fitted into the fastening hole 33 of the rotation shaft 30. Thereby, the rotation shaft 30 and the coupling shaft 41 of the grinding part 40 are firmly fixed to each other.

The rotation shaft 30, the grinding part 40, and the fastening member 60 may be formed of the same synthetic resin material as the cover 20 so as to be able to be used only once.

The disposable grinder 100 having this configuration is mounted on the mixer after fruits and/or vegetables are placed in the container 10 and the container 10 is sealed by the cover 20. The grinding part 40 housed in the container 10 is rotated to grind the fruits and/or the vegetables into a fruit and/or vegetable juice. When the juice is made in this way, the cover 20 having the grinding part 40 can be separated from the container 10, and be thrown away.

Figure 4:
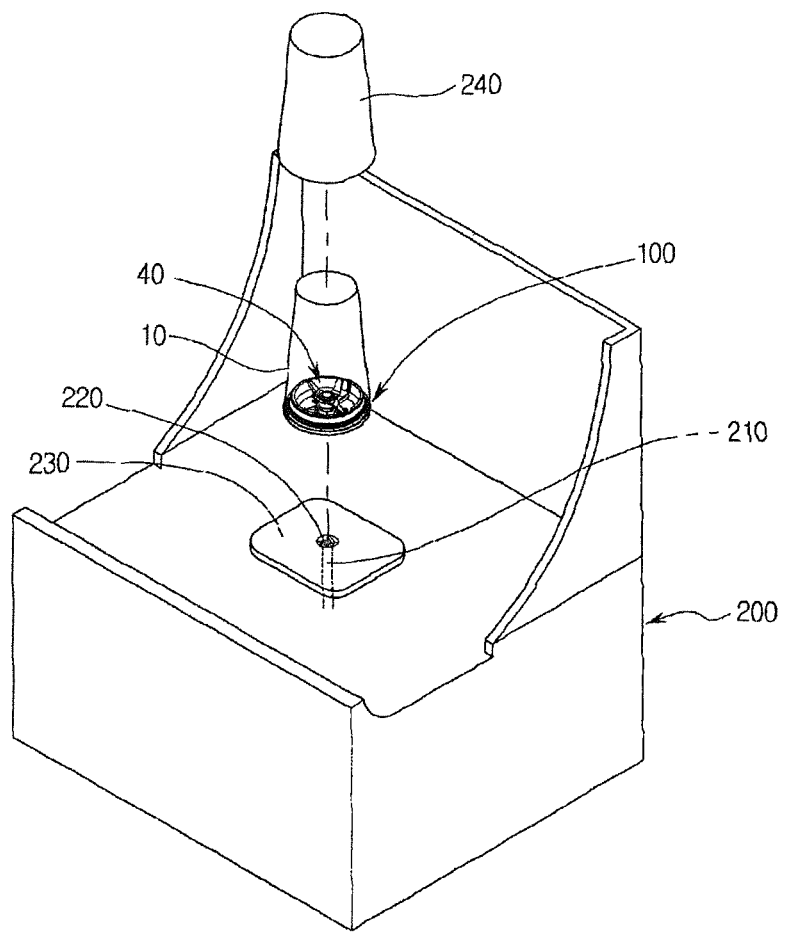
FIG. 4 is a perspective view showing a mixer on which the disposable grinder according to the embodiment of the present invention is mounted.

FIG. 4 is a perspective view showing a mixer on which the disposable grinder according to the embodiment of the present invention is mounted.

As shown in FIG. 4, the mixer 200 on which the disposable grinder 100 is mounted has a built-in driving motor (not shown). When the mixer 200 is powered, the driving motor (not shown) is driven, and thus a driving shaft 210 thereof is rotated.

The driving shaft 210 is provided with a transmission part 220 at an end thereof which is formed in a corrugated shape so that the mounting part 31 of the rotation shaft 30 of the disposable grinder 100 is mounted.

Further, the mixer 200 is provided with a cover holder 230 on which the cover 20 of the disposable grinder 100 is placed. In detail, the cover 20 coupled to the container 10 is placed on the cover holder 230 so as to be located downwards. Here, the mounting part 31 of the rotation shaft 30 is mounted on the transmission part 220 of the driving motor, and is supplied with a rotational force of the driving motor. Thereby, the grinding part 40 is able to grind the contents contained in the container 10.

Further, the mixer 200 may be provided with a cup holder 240 covering the container 10 when the disposable grinder 100 is placed on the cover holder 230.

The cup holder 240 is mounted on the cover holder 230, and fixes the container 10 when the contents contained in the container 10 are ground by the operation of the mixer 200. Thereby, the container 10 is prevented from being fluctuated, so that the contents can be stably ground.

Next, a method of use for the disposable grinder configured as described above in accordance with the embodiment of the present invention will be described with reference to FIGS. 1 to 4.

The disposable grinder 100 of the present invention is used at shops such as fast food shops, snack bars, take-out shops, and beverage shops. When a consumer orders a raw fruit juice according to his/her taste, relevant fruits are placed in the container 10. Then, the cover 20 is coupled and closes the container 10.

Next, the rotation shaft 30 of the cover 20 is mounted on the mixer 200. Then, the mixer 200 is operated, and thus the grinding part 40 is rotated. Thereby, the fruits contained in the container 10 are ground. Here, the plurality of ribs 50 formed in the inner surface of the cover 20 grind the ground fruits again. The fruits are finely ground into a raw fruit juice.

The raw fruit juice made in this way is delivered to a consumer after the cover 20 coupled to the container 10 is separated.

As another example, a supplier cleanly washes a variety of fruits and/or vegetables according to a menu, and delivers the containers 10 in which the washed fruits and/or vegetables are contained, which are sealed by the covers having the respective grinding parts, 40 to shops such as fast food shops, snack bars, take-out shops, and beverage shops. The cover 20 of each delivered container 10 is mounted on the mixer 200 at each shop, and the fruits and/or the vegetables contained in the container 10 are ground into a juice. The juice made in this way is delivered to a consumer after the cover 20 coupled to the container 10 is separated.

As described above, the disposable grinder of the present invention is configured so that the plurality of grinding blades are installed on the cover opening or closing the container, and thus directly grind the fruits and/or the vegetables into a juice. The disposable grinder can be thrown away after being used only once, and thus the juice can be supplied sanitarily.

Further, the plurality of ribs formed in the inner surface of the cover re-grind the fruits and/or the vegetables ground by the grinding blades, so that a good quality of juice can be supplied.

In addition, the cover and the grinding blades are firmly fastened, and thus the disposable grinder can be safely used when the grinding blades are rotated at a high speed.

Although the embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:
1. A disposable grinder mounted on or demounted from a mixer, comprising:
    a cover that opens or closes an opening of a container;
    a rotation shaft that is rotatably installed on a central portion of the cover, is mounted on the mixer, and is supplied with a rotational force from the mixer;
    a grinding part that is coupled to the rotation shaft so as to be housed inside the container, and has a plurality of grinding blades receiving a rotational force of the rotation shaft to grind contents contained in the container;

a plurality of ribs that protrude radially from the central portion of the cover and from an inner surface of the cover, and collide with the contents ground by the grinding part to re-grind the ground contents; and a cup holder configured for coverina the container when the disposable grinder is placed on a cover holder on which the cover of the disposable grinder is placed, so that the cover coupled to the container is placed on the cover holder so as to be located downwards.

2. The disposable grinder according to claim 1, further comprising a fastening member that fixes the grinding part and the rotation shaft so as not to be separated from each other.

3. The disposable grinder according to claim 2, wherein the fastening member includes a fastening pin that passes through the grinding part and is fastened to the rotation shaft, and a fixing plate that is formed on the fastening pin so as to prevent the grinding Part from being separated from the fastening pin, and to fix the grinding part.

4. The disposable grinder according to claim 1, wherein the plurality of grinding blades are disposed around an axis of the rotation shaft at regular intervals, and blade faces thereof are bent at different angles with respect to the inner surface of the cover.

* * * * *